US012657108B2

(12) United States Patent
Griffin et al.

(10) Patent No.: US 12,657,108 B2
(45) Date of Patent: Jun. 16, 2026

(54) CONTROLLING EXECUTION OF SOFTWARE APPLICATIONS BASED ON APPLICATION PROFILES TO FACILITATE SAFETY COMPLIANCE

(71) Applicant: Red Hat, Inc., Raleigh, NC (US)

(72) Inventors: Leigh Griffin, Waterford (IE); Priyanka Verma, Grasbrunn (DE)

(73) Assignee: Red Hat, Inc., Raleigh, NC (US)

( * ) Notice: Subject to any disclaimer, the term of this patent is extended or adjusted under 35 U.S.C. 154(b) by 221 days.

(21) Appl. No.: 18/486,810

(22) Filed: Oct. 13, 2023

(65) Prior Publication Data

US 2025/0123945 A1      Apr. 17, 2025

(51) Int. Cl.
*G06F 11/3604* (2025.01)
*G06F 8/60* (2018.01)
*G06F 11/3698* (2025.01)
*G06F 21/53* (2013.01)
*G06F 21/57* (2013.01)

(52) U.S. Cl.
CPC ............ *G06F 11/3604* (2013.01); *G06F 8/60* (2013.01); *G06F 11/3698* (2025.01); *G06F 21/53* (2013.01); *G06F 21/577* (2013.01)

(58) Field of Classification Search
None
See application file for complete search history.

(56) References Cited

U.S. PATENT DOCUMENTS

| | | | |
|---|---|---|---|
| 10,545,849 B2 * | 1/2020 | Salameh | G06F 9/44505 |
| 2017/0269955 A1 * | 9/2017 | Hardy | G06F 9/45558 |
| 2021/0157560 A1 * | 5/2021 | Orozco | G06F 8/60 |

* cited by examiner

*Primary Examiner* — Lewis A Bullock, Jr.
*Assistant Examiner* — Mark A Gooray
(74) *Attorney, Agent, or Firm* — Kilpatrick Townsend & Stockton LLP

(57) ABSTRACT

Execution of software applications can be controlled based on application profiles to facilitate safety compliance. For example, a system can execute a test suite to identify a function call of a software application that is associated with a functional safety standard issued by a standard-setting organization. In response to identifying the function call, the system can generate a risk score for the function call. The risk score can indicate a likelihood of the function call causing non-compliance with the functional safety standard. The system can further generate an application profile including a permission for the software application based on the risk score. The permission may disable the function call of the software application. The system may then execute the software application based on the application profile. As a result, execution of the software application can comply with the functional safety standard.

12 Claims, 3 Drawing Sheets

300

302
Execute a test suite to identify a function call of plurality of function calls of a software application that is associated with a functional safety standard issued by a standard-setting organization 304
Generate a risk score indicating a likelihood of the function call causing non-compliance with the functional safety standard 306
Generate an application profile comprising a permission for the software application based on the risk score, the permission configured to disable the function call 308
Execute the software application based on the application profile to facilitate compliance with the functional safety standard

100

200

300

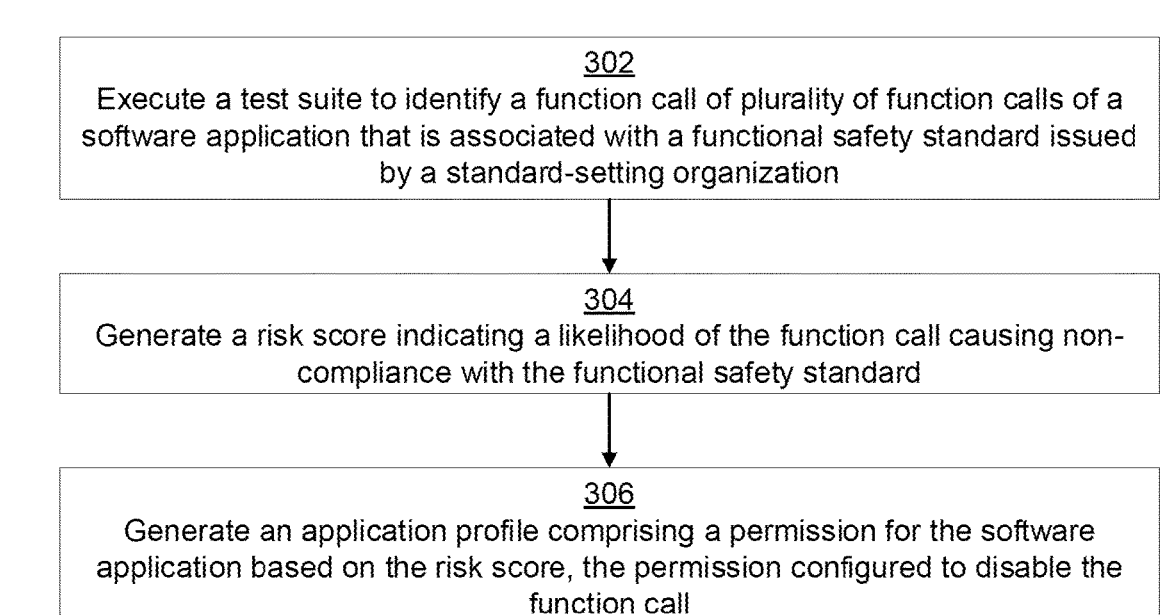

<u>302</u>
Execute a test suite to identify a function call of plurality of function calls of a software application that is associated with a functional safety standard issued by a standard-setting organization <u>304</u>
Generate a risk score indicating a likelihood of the function call causing non-compliance with the functional safety standard <u>306</u>
Generate an application profile comprising a permission for the software application based on the risk score, the permission configured to disable the function call <u>308</u>
Execute the software application based on the application profile to facilitate compliance with the functional safety standard

FIG. 3

CONTROLLING EXECUTION OF SOFTWARE APPLICATIONS BASED ON APPLICATION PROFILES TO FACILITATE SAFETY COMPLIANCE

TECHNICAL FIELD

The present disclosure relates generally to software deployment and evaluation and, more particularly (although not necessarily exclusively), to controlling execution of a software application based on an application profile to facilitate safety compliance.

BACKGROUND

Many organizations around the globe have developed functional safety standards for software and electronics. Functional safety relates to reducing risks so that computing systems function safely in the event that there is a malfunction. One example of a functional safety standard is ISO 26262 for automotive electronics. Functional safety standards can be used to avoid or mitigate systematic failures and hardware failures to prevent hazardous operational situations. A software package can be certified to a functional safety standard based on a target level of risk reduction. For example, an Automotive Safety Integrity Level (ASIL) assignment with respect to ISO 26262 has four possible levels of safety requirements: ASIL A, ASIL B, ASIL C, and ASIL D. ASIL D has the highest safety requirements of the four possible levels and includes the safety requirements of the three preceding levels.

Such software packages can be deployed inside containers within a computing environment. A container is a relatively isolated virtual environment created by leveraging the resource isolation features (e.g., cgroups and namespaces) of the Linux Kernel. Deploying software services inside containers can help isolate the software services from one another, which can improve speed and security and provide other benefits.

BRIEF DESCRIPTION OF THE DRAWINGS

FIG. 3 is a flowchart of an example of a process for controlling execution of a software application based on an application profile to facilitate safety compliance according to some embodiments of the present disclosure.

DETAILED DESCRIPTION

Figure 1:
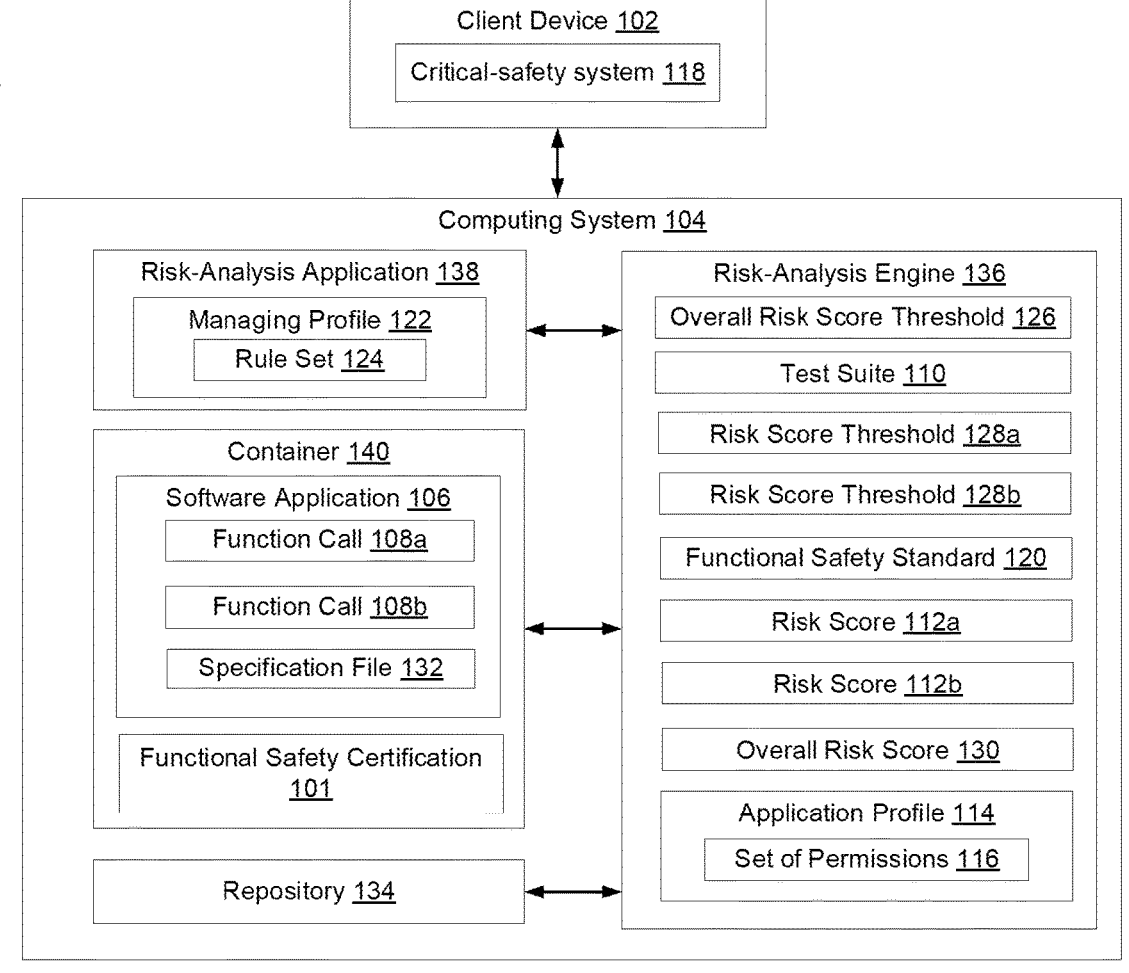
FIG. 1 is a block diagram of an example of a computing environment for controlling execution of a software application based on an application profile to facilitate safety compliance according to some embodiments of the present disclosure.

A software developer or software development organization may want or need to comply with a functional safety standard issued by a standard-setting organization when deploying a software application at a device with one or more critical-safety systems. In some cases, a function call (e.g., an API call or a resource call) of the software application may interfere with an API, resource, or software application of the critical-safety system. For example, there may be conflicts associated with resource consumption, task scheduling or execution, communication, or any combination of these between the function call and the API, resource, or application. When such interference occurs, it can cause unpredictable behavior (e.g., failures, malfunctions, etc.) for the critical-safety system, which can cause hazardous operational situations.

Some examples of the present disclosure can overcome one or more of the issues mentioned above via a system that generates application profiles to govern execution of software applications and facilitate safety compliance. For example, the system can score or grade a software application, or each function of a software application, based on a risk of the software application or each function to the critical-safety system. More specifically, the system may generate risk scores for the application or each function indicating a likelihood of the application or each function being non-compliant with a function safety standard. If the risk scores exceed one or more thresholds, the system can perform further risk analysis to identify whether disabling some functionalities of the software application can decrease the associated risk. Based on the risk analysis, the system can generate the application profile with a set of permissions to govern which functionalities (e.g., function calls) of the software application are safe to execute and which functionalities of the software application should be disabled. The system can then operate in accordance with the application profile for the software application, for example by allowing the safe functions and preventing the unsafe functions. In this way, the system can modify execution of software applications to facilitate safety compliance, rather than implementing alternative approaches such as rejecting execution of the software application as a whole. This can enable various software applications to be deployed at devices with critical-safety systems, without risking non-compliance of functional safety standards for the critical-safety systems.

In one particular example, a computing system with a critical-safety system can execute a risk-analysis engine. For example, the computing system can be an automotive system and the critical-safety system can be a break subsystem of the automotive system. The risk-analysis engine may detect a software application being loaded at the computing system. The risk-analysis engine can then deploy the software application inside a container to isolate the software application from the critical-safety system.

Subsequent to isolating the software application, the risk-analysis engine can execute a test suite to identify whether the software application interferes with the critical-safety system. For example, the risk analysis engine can identify, based on the test suite execution, that a set of API calls of the software applications can interfere with an API of the critical-safety system. In this way, the risk-analysis engine can conclude that the software application is associated with a functional safety standard and should be further analyzed prior to execution at the computing system. The risk-analysis engine can then generate risk scores indicating a likelihood of each API call of the software application causing non-compliance with the functional safety standard. The risk-analysis engine can then determine whether each risk score exceeds a corresponding risk score threshold.

The risk-analysis engine can further generate an application profile based on which risk scores exceeded the corresponding risk score thresholds. For example, the application profile can include a set of permissions configured to disable each API call with a risk score exceeding the corresponding risk score threshold. After generating the application profile, the risk-analysis engine can release the software application from the container and execute the software application at the computing system in accordance with the set of permissions set in the application profile. As a result, the software application can comply with the functional safety standard.

Illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

FIG. 1 is a block diagram of an example of a computing environment 100 for controlling execution of a software application 106 based on an application profile 114 to facilitate safety compliance according to some embodiments of the present disclosure. The computing environment 100 can include a computing system 104 and a client device 102. The computing system 104 may be part of the client device 102 or the computing system 104 may be external to and communicatively coupled with the client device 102. For example, the computing system 104 and the client device 102 may be communicatively coupled via a network, such as a local area network (LAN), wide area network (WAN), the Internet, or any combination thereof. Examples of the computing system 104 or the client device 102 can include an automotive system, medical device system, desktop computer, laptop computer, server, mobile phone, or tablet.

In some examples, one or more functional safety standards can be associated with the client device 102 to avoid or mitigate systematic failures and hardware failures. For example, the client device 102 can include a critical-safety system 118. The critical-safety system 118 can be a system that may cause hazardous operational situations (e.g., harm to a user of the client device 102 or to an environment associated with the client device 102) if the system fails or malfunctions. Thus, software applications or other suitable components interacting with the critical-safety system 118 can be required comply with a functional safety standard 120 for the critical-safety system 118.

A functional safety certification 101 can provide confirmation that the software application 106 complies with one or more safety standards (e.g., functional safety standard 120). The functional safety certification 101 may be overseen by a standard-setting organization (e.g., International Organization for Standardization (ISO), International Electrotechnical Commission (IEC), etc.). Examples of the functional safety certification 101 associated with transportation can include ISO 26262 for road vehicles, ISO 25119 for machinery associated with agriculture and forestry, and ISO 15998 for earth-moving machinery. Medical applications of the functional safety certification 101 may include IEC 60601 for medical devices or IEC 62304 for medical device software. Additionally, compliance-related policies (e.g., the Health Insurance Portability and Accountability Act (HIPAA), etc.) may involve a similar certification with respect to safety.

To receive or prevent invalidation of the functional safety certification 101 for the software application 106, a risk-analysis engine 136 of the computing system 104 can evaluate the software application 106 prior to execution at the client device 102. For example, the risk-analysis engine 136 can may initially detect the software application 106 being loaded to the client device 102 by a user. The software application 106 can be loaded from an external storage device (e.g., a USB) or from a centralized repository of software applications. The risk-analysis engineer 136 may further determine that the software application 106 is or potentially may be a rogue software application. A rogue software application can potentially disrupt or compromise operations performed by the client device 102.

Additionally, in response to detecting the software application 106 being loaded to the client device 102, the risk-analysis engine 136 may deploy the software application 106 inside a container 140. In this way, the risk-analysis engine 136 can isolate the software application 106 to minimize a likelihood the software application 106 interfering with the critical-safety system 118. As one particular example, the client device 102 can be or be part of an automotive system, and the critical-safety system 118 can be a break subsystem of the automotive system. Thus, isolating the software application 106 at the container 140 can prevent interference between function calls 108a-b of the software application and application programming interfaces (APIs) of the break subsystem. Interference between the function calls 108a-b and the APIs may cause brake failure or other suitable undesirable effects.

Subsequent to isolating the software application 106, the risk-analysis engine 136 may execute a test suite 110 to identify whether one or more of the function calls 112a-b are associated with one or more standards such as functional safety standard 120. Executing the test suite 110 can involve shimming or mocking the function calls 112a-b. The function calls 112a-b can be API calls, resource calls, or the like made by the software application 106. A function call 108a can be associated with the functional safety standard 120 if the function call 108a can impact operations performed by critical-safety system 118. For example, the function call 112a can utilize (e.g., interact with) a functional safety path. The functional safety path can be an API, resource (e.g., data), or application associated with the critical-safety system 118.

In an example, as a result of executing the test suite 110, the risk-analysis engine 136 can determine that first function call 108a is associated with functional safety standard 120. In particular, the first function call 108a can interact with an API of the critical-safety system 118. Due the software application 106 being associated with the functional safety standard 120, further risk analysis of the software application 106 can be performed. For example, risk scores 112a-b can be determined for each of the function calls 108a-b. The risk scores 112a-b can each indicate a likelihood of the function calls 108a-b causing non-compliance with the functional safety standard 120.

In some examples, the risk-analysis engine 136 can execute a risk-analysis application 138 (e.g., AppArmor) to analyze the software application 106 based on a managing profile 122. The managing profile 122 can specify which resources, software applications, or the like executing on the client device 102 are associated with standards, critical-safety systems, or a combination thereof. The managing profile 122 can also include a rule set 124 from which likelihoods of the function calls causing non-compliance can be derived. For example, the risk-analysis engine 136 can determine, based on the rule set 124, a first risk score 112a for the first function call 108a and a second risk score 112b for a second function call 108b. The first risk score 112a can be greater than the second risk score 112b due to the first function call 108a interacting with the API of the critical-safety system 118. The risk-analysis engine 136 may also generate an overall risk score 130 for the software application 106. For example, the overall risk score 130 can be the sum of the individual risk scores 112*a-b* for the function calls 108*a-b*.

In some examples, the risk-analysis engine 136 may then determine whether the overall risk score 130 meets or exceeds an overall risk score threshold 126. If the overall risk score 130 is below the overall risk score threshold 126, the risk-analysis engine 136 may automatically deploy the software application 106 outside of the container 140. Thus, the software application 106 can be executed on a base operating system of the client device 102 (e.g., in a non-isolated manner). Alternatively, in another embodiment in which lower risk scores are indicative of riskier software, if the overall risk score 130 is below the overall risk score threshold 126, the computing system can automatically prevent execution of the software application 106 at the client device 102.

In some examples, the overall risk score 130 can be greater than the overall risk score threshold 126, indicating that the software is risky to execute. So, based on determining that the overall risk score 130 is greater than or equal to the threshold 126, the risk-analysis engine 136 can perform further testing to identify whether modifying or turning off some of the functionality (e.g., one or both of function calls 108*a-b*) of the software application 106 can bring the overall risk score 130 below the overall risk score threshold 126, thereby bringing the software application 106 into compliance with the function safety standard 120. To do so, the risk-analysis engine 136 can generate an application profile 114 for the software application 106. The application profile 114 can include a set of permissions 116 governing which functionalities of the software application 106 are enabled and which are disabled.

To generate the application profile 114, the risk-analysis engine 136 can determine whether the each of the risk scores 112*a-b* meets or exceeds corresponding risk score thresholds 128*a-b*. In the example, the first risk score 112*a* can meet or exceed a first risk score threshold 128*a* and the second risk score 112*b* can be below a second risk score threshold 128*b*. As a result, the computing system 104 can configure the set of permissions 116 to disable execution of the first function call 108*a* and to enable execution of the second function call 108*b*.

Disabling the first function call 108*a* can lower the overall risk score 130 to below the overall risk score threshold 126. Thus, the risk-analysis engine 136 can then release the software application 106 from the container 140 and execute the software application 106 at the client device 102 based on the application profile 114. In this way, the risk-analysis engine 136 can allow the user to load and use the software application 106 while preventing non-compliance with the functional safety standard 120. Additionally, by controlling execution of the software application 106 based on the application profile 114, the critical-safety system 118 can operate with minimal risk of interference from the software application 106. Moreover, the software application 106 can receive or maintain the functional safety certification 101.

In some examples, the risk-analysis engine 136 can also modify a specification file 132 of the software application 106 to include the application profile 114, thereby packaging the application profile 114 with the software application 106. The specification file 132 can be a file or document outlining requirements and specifications for the software application 106. For example, the specification file 132 can include tasks performed by the software application, data requirements for the software application 106 (e.g., an indication of types of data stored by the software application or an indication of how the types of data should be structured), dependency information for the software application 106, etc. In contrast, the application profile 114 can provide governing rules (e.g., the set of permissions 116) for executing the software application 106. By adding the application profile 114 to the specification file 132, the software application 106 can automatically run with the set of permissions 116 on another client device with a same or similar operating system, firmware, or other suitable similarities to the client device 102, without that other client device having to perform its own risk assessment and profile generation.

Additionally, or alternatively, the application profile 114 can be stored in a repository 134. Thus, if the software application 106 is loaded at another client device with the same or similar operating system, firmware, or other suitable similarities to the client device 102, the application profile 114 can be retrieved from the repository 134 to allow efficient execution of the software application 106 with the set of permissions 116, without that other client device having to perform its own risk assessment and profile generation.

While FIG. 1 depicts a specific arrangement of components, other examples can include more components, fewer components, different components, or a different arrangement of the components shown in FIG. 1. For instance, in other examples, the risk-analysis engine 136 may be positioned external to the computing system 104. Additionally, the client device 102, the computing system 104, or a combination thereof can be used to implement the process (es) described herein.

Figure 2:
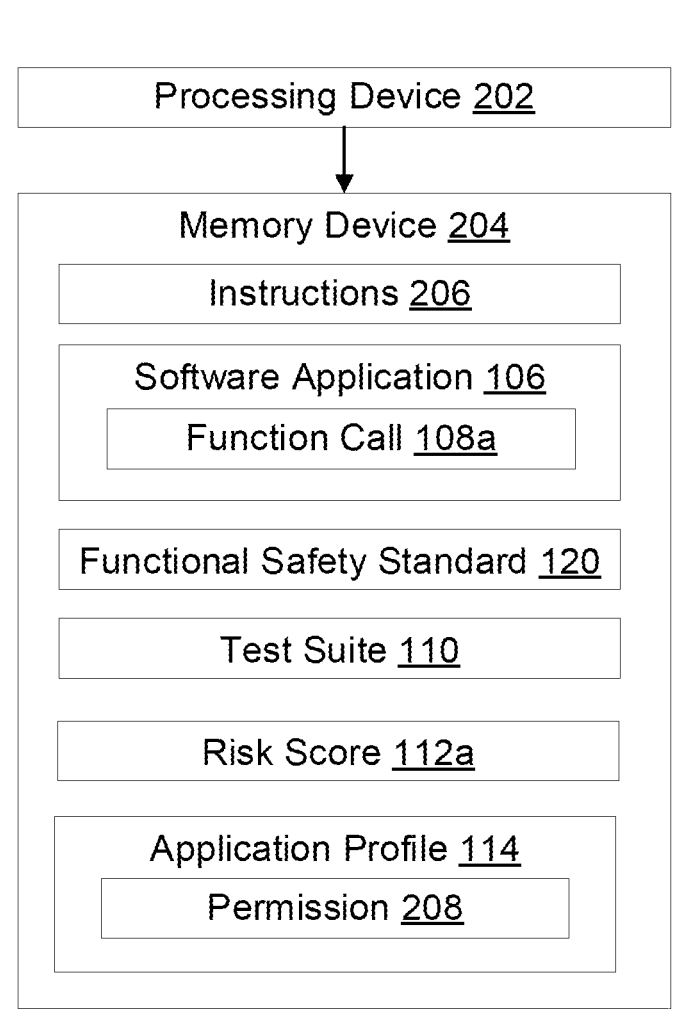
FIG. 2 is a block diagram of another example of a computing environment for controlling execution of a software application based on an application profile to facilitate safety compliance according to some embodiments of the present disclosure.

FIG. 2 is a block diagram of another example of a computing environment 200 for controlling execution of a software application 106 based on an application profile 114 to facilitate safety compliance according to some embodiments of the present disclosure. The computing environment 200 can include a processing device 202 communicatively coupled to a memory device 204.

The processing device 202 can include one processing device or multiple processing devices. The processing device 202 can be referred to as a processor. Non-limiting examples of the processing device 202 include a Field-Programmable Gate Array (FPGA), an application-specific integrated circuit (ASIC), and a microprocessor. The processing device 202 can execute instructions 206 stored in the memory device 204 to perform operations. In some examples, the instructions 206 can include processor-specific instructions generated by a compiler or an interpreter from code written in any suitable computer-programming language, such as C, C++, C #, Java, Python, or any combination of these.

The memory device 204 can include one memory device or multiple memory devices. The memory device 204 can be non-volatile and may include any type of memory device that retains stored information when powered off. Non-limiting examples of the memory device 204 include electrically erasable and programmable read-only memory (EEPROM), flash memory, or any other type of non-volatile memory. At least some of the memory device 204 includes a non-transitory computer-readable medium from which the processing device 202 can read instructions 206. A computer-readable medium can include electronic, optical, magnetic, or other storage devices capable of providing the processing device 202 with the instructions 206 or other program code executable to perform operations. Non-limiting examples of a computer-readable medium include magnetic disk(s), memory chip(s), ROM, random-access memory (RAM), an ASIC, a configured processor, and optical storage.

In some examples, the processing device 202 can execute the instructions 206 to perform operations. For example, the processing device 202 can execute a test suite 110 to identify a function call 108a of plurality of function calls 108a-b of a software application 106 that is associated with a functional safety standard 120 issued by a standard-setting organization. In response to identifying the function call 108, the processing device 202 can generate a risk score 112a. The risk score 112a can indicate a likelihood of the function call 108a causing non-compliance with the functional safety standard 120. The processing device 202 can further generate an application profile 114 comprising a permission 208 for the software application 106 based on the risk score 112a. The permission 208 can disable the function call 108a. The processing device 202 can further execute the software application 106 based on the application profile 114 to facilitate compliance with the functional safety standard 120.

FIG. 3 is a flowchart of an example of a process 300 for controlling execution of a software application 106 based on an application profile 114 to facilitate safety compliance according to some embodiments of the present disclosure. In some examples, the processing device 202 can perform one or more of the steps shown in FIG. 3. For example, the processing device 202 can execute the risk-analysis engine 136 of FIG. 1 to perform one or more of the steps shown in FIG. 3. In other examples, the processing device 202 can implement more steps, fewer steps, different steps, or a different order of the steps depicted in FIG. 3. The steps of FIG. 3 are described below with reference to components discussed above in FIGS. 1-2.

At block 302, the processing device 202 can execute a test suite 110 to identify a function call 108a of a plurality of function calls 108a-b of a software application 106 that is associated with a functional safety standard 120 issued by a standard-setting organization. In some examples, the processing device 202 can perform shimming or mocking of the function calls 112a-b as part of executing the test suite 110. In doing so, the processing device 202 can determine that the function call 108a can interfere with a functional safety application. The functional safety application can be an application performing operations associated with a critical-safety system 118 of a client device 102. The critical-safety system 118 can be a system that may cause harm to a user or to an environment if the system fails or malfunctions. Due to the execution of the test suite 110 indicating that the function call 108a can interfere with the functional safety application, the software application 106 may need to have its functionality modified to comply with a functional safety standard 120 for the critical-safety system 118.

At block 304, the processing device 202 can generate a risk score 112a indicating a likelihood of the function call 108a causing non-compliance with the functional safety standard 120. The risk score 112a can be determined in response to the processing device 202 determining that the software application 106 is associated with the functional safety standard 120. In some examples, the processing device 202 can execute a risk-analysis application 138 to analyze the functions 108a based on a rule set 124 of a managing profile 122. The risk-analysis application 138 may enable a user to define the rule set 124 or may generate the rule set 124 based on the functional safety standard 120. Thus, the risk scores 112a can be derived based at least in part on the analysis by the risk-analysis application 138.

At block 306, the processing device 202 can generate an application profile 114 comprising a permission 208 for the software application 106 based on the risk score 112a. The permission 208 can disable the function call 108a to facilitate compliance with the functional safety standard 120. For example, the processing device 202 can determine a risk score threshold 128a for the function call 108a. The risk score threshold 128a can define an amount of risk acceptable for the critical-safety system 118. Risk score thresholds can differ depending on operations associated with function calls. For example, a first risk score threshold 128a for the first function call 108a can be lower than a second risk score threshold 128b for a second function call 108b due to the first function call 108a interfering with the functional safety application. If the risk score 112a meets or exceeds the risk score threshold 128a, the permission 208 can be configured to disable the function call 108a. In some examples, the processing device 202 may also generate the application profile 114 with permissions for other function calls. For example, if a risk score 112b for the second function call 108b is below the risk score threshold 128b, the application profile 114 may include another permission configured to enable the second function call 108b.

At block 308, the processing device 202 can execute the software application 106 based on the application profile 114 to facilitate compliance with the functional safety standard 120. For example, the software application 106 can perform some tasks at the client device 102, but may not perform function call 108a due to the function call 108a being disabled by the permission 208 of the application profile 114. By not performing the function call 108a, a risk of execution of the software application 106 interfering with the critical-safety system 118 can be minimized.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A system comprising:

a processing device; and a memory device that includes instructions executable by the processing device for causing the processing device to perform operations comprising:

detecting a software application being loaded to a client device;

in response to detecting the software application being loaded to the client device, deploying the software application inside a container;

executing, while the software application is deployed in the container, a test suite to identify a function call, of a plurality of function calls of the software application, that is associated with a functional safety standard issued by a standard setting organization;

in response to identifying the function call, generating a risk score indicating a likelihood of the function call causing non-compliance with the functional safety standard;

generating an application profile comprising a permission for the software application;

determining whether the risk score meets or exceeds a risk score threshold;

based on determining that the risk score meets or exceeds the risk score threshold, configuring the permission to disable execution of the function call;

generating an overall risk score for the software application based on a plurality of individual risk scores computed for the plurality of functions of the software application, wherein the overall risk score indicates a likelihood that executing the software application will cause non-compliance with the functional safety standard;

determine whether the overall risk score meets or exceeds an overall risk score threshold; and based on determining that the overall risk score meets or exceeds the overall risk score threshold, automatically prevent execution the software application at a client device; or based on determining that the overall risk score is below the overall risk score threshold, releasing the software application from the container and automatically executing the software application on the client device based on the application profile to facilitate compliance with the functional safety standard.

2. The system of claim 1, wherein the operations further comprise:

generating the risk score by evaluating the function call based on a managing profile, wherein the managing profile comprises a rule set based on the functional safety standard.

3. The system of claim 1, wherein the operation of executing the software application based on the application profile comprises executing each function call of the plurality of function calls except for the function call.

4. The system of claim 1, wherein the operations further comprise modifying a specification file of the software application to include the application profile.

5. The system of claim 1, wherein the operations further comprise storing the application profile in a repository for subsequent use by client devices in controlling operability of the software application.

6. A method comprising:

detecting a software application being loaded to a client device;

in response to detecting the software application being loaded to the client device, deploying the software application inside a container;

executing, while the software application is isolated in the container, a test suite to identify a function call, of a plurality of function calls of a software application, that is associated with a functional safety standard issued by a standard-setting organization;

in response to identifying the function call, generating a risk score indicating a likelihood of the function call causing non-compliance with the functional safety standard;

generating an application profile comprising a permission for the software application;

determining whether the risk score meets or exceeds a risk score threshold;

based on determining that the risk score meets or exceeds the risk score threshold, configuring the permission to disable execution of the function call;

generating an overall risk score for the software application based on a plurality of individual risk scores computed for the plurality of functions of the software application, wherein the overall risk score indicates a likelihood that executing the software application will cause non-compliance with the functional safety standard;

determine whether the overall risk score meets or exceeds an overall risk score threshold; and

based on determining that the overall risk score meets or exceeds the overall risk score threshold, automatically prevent execution the software application at a client device; or based on determining that the overall risk score is below the overall risk score threshold, releasing the software application from the container and automatically executing the software application on the client device based on the application profile to facilitate compliance with the functional safety standard.

7. The method of claim 6, further comprising:

generating the risk score by evaluating the function call based on a managing profile, wherein the managing profile comprises a rule set based on the functional safety standard.

8. The method of claim 6, wherein executing the software application based on the application profile comprises executing each function call of the plurality of function calls except for the function call.

9. The method of claim 6, further comprising modifying a specification file of the software application to include the application profile.

10. A non-transitory computer-readable medium comprising instructions that are executable by a processing device for causing the processing device to perform operations comprising:

detecting a software application being loaded to a client device;

in response to detecting the software application being loaded to the client device, deploying the software application inside a container;

executing, while the software application is deployed in the container, a test suite to identify a function call, of a plurality of function calls of a software application, that is associated with a functional safety standard issued by a standard-setting organization;

in response to identifying the function call, generating a risk score indicating a likelihood of the function call causing non-compliance with the functional safety standard;

generating an application profile comprising a permission for the software application;

determining whether the risk score meets or exceeds a risk score threshold;

based on determining that the risk score meets or exceeds the risk score threshold, configuring the permission to disable execution of the function call;

generating an overall risk score for the software application based on a plurality of individual risk scores computed for the plurality of functions of the software application, wherein the overall risk score indicates a likelihood that executing the software application will cause non-compliance with the functional safety standard;

determine whether the overall risk score meets or exceeds an overall risk score threshold; and based on determining that the overall risk score meets or exceeds the overall risk score threshold, automatically prevent execution the software application at a client device; or based on determining that the overall risk score is below the overall risk score threshold releasing the software application from the container and automatically executing the software application on the client device based on the application profile to facilitate compliance with the functional safety standard.

11. The non-transitory computer-readable medium of claim 10, wherein the operations further comprise:

generating the risk score by evaluating the function call based on a managing profile, wherein the managing profile comprises a rule set based on the functional safety standard.

12. The non-transitory computer-readable medium of claim 10, wherein the operation of executing the software application based on the application profile comprises executing each function call of the plurality of function calls except for the function call.

\*   \*   \*   \*   \*